B. I. STORMS.
NUT LOCK.
APPLICATION FILED OCT. 13, 1920.

1,371,946.

Patented Mar. 15, 1921.

Inventor
B. I. Storms,

By Geo. P. Kimmel, Attorney

UNITED STATES PATENT OFFICE.

BERNARD I. STORMS, OF MASON CITY, IOWA.

NUT-LOCK.

1,371,946.   Specification of Letters Patent.   Patented Mar. 15, 1921.

Application filed October 13, 1920. Serial No. 416,688.

*To all whom it may concern:*

Be it known that I, BERNARD I. STORMS, a citizen of the United States, residing at Mason City, in the county of Cerro Gordo and State of Iowa, have invented certain new and useful Improvements in Nut-Locks, of which the following is a specification.

This invention relates to nut locks and more particularly to means for locking nuts on knuckle pins.

The object of the invention is to provide simple and efficient means for locking nuts to prevent all possibility of them turning on the bolt.

Another object is to provide a tapered key and a groove to receive it, one face of the key being flat to lock it against turning.

With these and other objects in view, the invention consists in certain novel features of construction, as hereinafter shown and described and then specifically pointed out in the claim, and in the drawings illustrative of the preferred embodiment of the invention.

Figure 1:
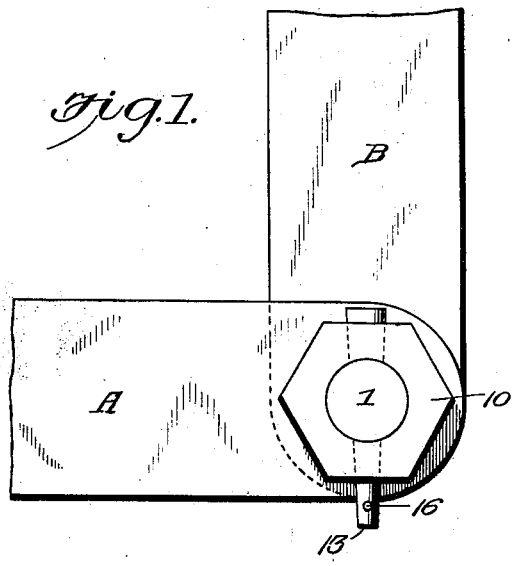
Figure 1 represents a side elevation of two members connected by a bolt and nut equipped with this improved lock.
Figure 3:
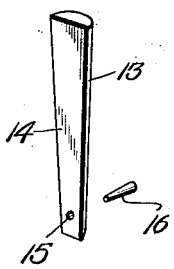
Fig. 3 is a detail perspective view of the locking pin or key with a cotter pin shown arranged in juxtaposition ready for assembling.
Figure 4:
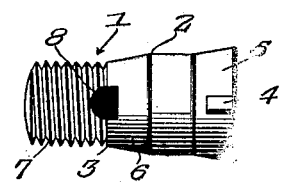
Fig. 4 is a side elevation of a knuckle pin in connection with which the improved lock is used, and, Fig. 5 is a face view of a nut in connection with which the lock is used.
Figure 5:
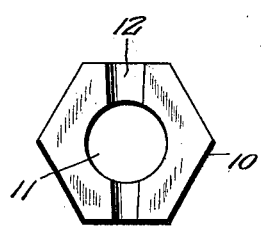

In the embodiment illustrated two members A and B are shown connected by a knuckle pin 1, the member A having one end bifurcated between the furcations $a$ of which is arranged the coöperating end of the member B. The knuckle pin receiving apertures in the member B and in one of the furcations $a$ are of the same size to receive the head 5 of the knuckle pin while the aperture in the other furcation $a$ of member A is of smaller diameter to receive the reduced portion 6 of the knuckle pin.

The pin 1 is shown provided with the usual shoulders 2 and 3 and with a radially extending wing 4 on the head 5 adapted to enter a notch in one of the furcations $a$. The threaded end 7 of the knuckle pin 1 has a bore 8 extending transversely therethrough adjacent the shoulder 3, said bore being shown semi-cylindrical in form. This bore tapers from one end to the other to receive a tapered locking pin 13 presently to be described.

The nut 10 which is designed to be screwed on the threaded portion 7 of pin 1 has the usual bolt receiving aperture 11 and arranged across the inner face thereof is a tapered groove 12 which intersects the bore 11 and is designed to register when the nut is applied with the bore 8 in the pin 1.

Figure 2:
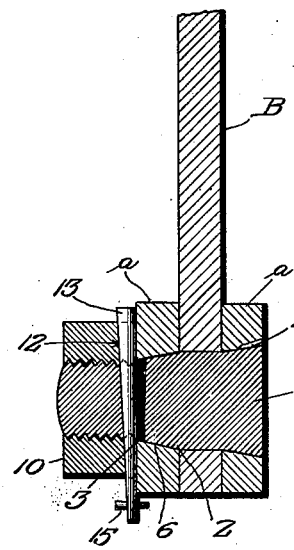
Fig. 2 is a longitudinal section thereof.

The locking pin 13 is designed to pass through the bore 8 and the groove 12 after the nut has been applied to the pin 1 and is provided with a flat face 14 which is designed to abut against the shoulder 3 and the outer face of one of the furcations $a$ as is shown clearly in Figs. 1 and 2 operating to prevent turning of the pin and to lock the nut against turning on pin 1. The smaller end of the locking pin 13 is apertured as shown at 15 to receive a cotter key or pin 16 to prevent longitudinal movement of the locking pin after it has been applied.

From the above description it will be obvious that while this improved lock is shown applied to a knuckle pin 1 and its coöperating nut it may be applied to any other form of bolt or nut, the flat face of the locking pin being adapted to bear against the work to be connected by the bolt as well as against the shoulder 3 of the knuckle pin.

The preferred embodiment of the invention is disclosed in the drawings and set forth in the specification, but it will be understood that any modifications within the scope of the claims may be made in the construction without departing from the principle of the invention or sacrificing any of its advantages.

What I claim is:

In a nut lock, a bolt having a bore extending transversely therethrough and having one flat wall, a nut for threaded engagement with the bolt having a transversely extending groove in one face to register with said bore when applied, and a key shaped to conform to the configuration of said bore having a flat face to engage the flat wall of the bore, said key, bore and groove being tapered to provide a wedging engagement of the parts, the flat face of the key being designed to abut one of the members connected by the bolt to lock the key against turning.

In testimony whereof, I affix my signature hereto.

BERNARD I. STORMS.